United States Patent
Hamama et al.

(10) Patent No.: US 8,635,006 B2
(45) Date of Patent: Jan. 21, 2014

(54) CONTROL SYSTEMS AND METHODS FOR ESTIMATING ENGINE COOLANT HEAT LOSS

(75) Inventors: Wajdi B. Hamama, Whitmore Lake, MI (US); John F. Van Gilder, Webberville, MI (US)

(73) Assignee: GM Global Technology Operations LLC

( * ) Notice: Subject to any disclaimer, the term of this patent is extended or adjusted under 35 U.S.C. 154(b) by 864 days.

(21) Appl. No.: 12/491,480

(22) Filed: Jun. 25, 2009

(65) Prior Publication Data

US 2010/0125401 A1 May 20, 2010

Related U.S. Application Data

(60) Provisional application No. 61/114,796, filed on Nov. 14, 2008.

(51) Int. Cl.
*G06F 19/00* (2011.01)
*G06G 7/64* (2006.01)

(52) U.S. Cl.
USPC .......................................... 701/113; 702/185

(58) Field of Classification Search
CPC ....... B60W 10/06; B60W 10/08; F02D 41/18; F02D 41/0002; F01P 11/16
USPC ......... 701/101, 102, 103, 104, 105, 106, 107, 701/113, 114, 115; 702/130, 131, 132, 136, 702/182, 183, 185; 73/114.68
See application file for complete search history.

(56) References Cited

U.S. PATENT DOCUMENTS

| | | | |
|---|---|---|---|
| 5,018,484 A * | 5/1991 | Naitoh | 123/41.12 |
| 6,128,948 A | 10/2000 | Shi et al. | |
| 6,200,021 B1 * | 3/2001 | Mitsutani et al. | 374/1 |
| 6,240,774 B1 * | 6/2001 | Niki et al. | 73/114.68 |
| 6,302,065 B1 * | 10/2001 | Davison | 123/41.15 |
| 6,321,695 B1 | 11/2001 | Yoo et al. | |
| 6,640,168 B2 * | 10/2003 | Kastner et al. | 701/36 |
| 6,679,110 B2 * | 1/2004 | Oka et al. | 73/114.68 |
| 6,732,025 B2 * | 5/2004 | Reese et al. | 701/31.9 |
| 6,925,376 B2 * | 8/2005 | Li et al. | 701/114 |
| 6,931,865 B1 * | 8/2005 | Van Gilder et al. | 62/129 |
| 6,957,570 B2 * | 10/2005 | Wakahara et al. | 73/114.68 |
| 7,024,926 B2 * | 4/2006 | Wakahara et al. | 73/114.68 |
| 7,261,067 B2 * | 8/2007 | Kim | 123/41.15 |
| 7,445,383 B2 * | 11/2008 | Huttenlocher et al. | 374/137 |
| 7,470,059 B2 * | 12/2008 | Yoshida et al. | 374/102 |
| 7,524,106 B2 * | 4/2009 | Higashiyama et al. | 374/145 |
| 2002/0099482 A1 * | 7/2002 | Reese et al. | 701/29 |
| 2002/0157620 A1 * | 10/2002 | Kastner et al. | 123/41.1 |
| 2002/0193921 A1 * | 12/2002 | Reese et al. | 701/29 |
| 2005/0102093 A1 * | 5/2005 | Wakahara et al. | 701/107 |
| 2010/0095909 A1 * | 4/2010 | Lin et al. | 123/41.02 |

* cited by examiner

*Primary Examiner* — Stephen K Cronin
*Assistant Examiner* — Raza Najmuddin (57) ABSTRACT

A control system for an engine includes an air calculation module that determines, based on a plurality of first coolant temperatures sensed during a period of engine operation, a first cumulative mass of intake air combusted by the engine during the period that corresponds to an estimated amount of heat dissipated by a cooling system of the engine during the period, and that determines, based on the first cumulative mass, a second cumulative mass of intake air of the engine that is required to raise a temperature of the engine from an initial temperature at a start of the period to a target temperature. The control system further includes a control module that selectively adjusts one of a diagnostic condition and an operating condition of the engine based on the second cumulative mass. A related method for controlling an engine is also provided.

14 Claims, 5 Drawing Sheets

CONTROL SYSTEMS AND METHODS FOR ESTIMATING ENGINE COOLANT HEAT LOSS

CROSS-REFERENCE TO RELATED APPLICATIONS

This application claims the benefit of U.S. Provisional Application No. 61/114,796, filed on Nov. 14, 2008. The disclosure of the above application is incorporated herein by reference in its entirety.

FIELD

The present disclosure relates to control systems and methods for internal combustion engines, and more particularly, to control systems and methods for estimating engine coolant heat loss.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air-fuel mixture and thereby produce a drive torque. To manage heat produced by the engine during combustion, a cooling system may be fluidly coupled to the engine. The cooling system may include a pump drivingly coupled to the engine that circulates coolant between the engine and a radiator. During operation, the coolant absorbs heat generated by the engine and dispels a portion of the absorbed heat to the surroundings. The cooling system may include a thermostat that inhibits the flow of coolant below a regulated temperature to allow the engine to heat up more quickly during cold starting and warm-up.

Operation of the engine may be regulated by a control module that receives various inputs from sensors of the engine and generates control signals that regulate actuators, such as a throttle, of the engine. The sensors may measure one or more operating conditions of the engine. Engine temperature is an important operating condition used in the control of the engine. The temperature of the engine may be estimated by determining a temperature of the coolant flowing though the engine. The coolant temperature is typically determined using a coolant temperature sensor in fluid communication with the coolant. The engine temperature is estimated based on the temperature of the coolant sensed by the coolant temperature sensor.

Engine diagnostic systems may monitor the operation of the engine, including the sensors and actuators included with the engine. When the diagnostic systems detect a problem with the coolant temperature sensor, a default coolant temperature may be used to regulate the engine instead of the measured temperature. For example, the engine may be regulated based on a coolant temperature estimate.

SUMMARY

The present disclosure provides a control system for an engine that includes an air calculation module that determines, based on a plurality of first coolant temperatures sensed during a period of engine operation, a first cumulative mass of intake air combusted by the engine during the period that corresponds to an estimated amount of heat dissipated by a cooling system of the engine during the period. The air calculation module also determines, based on the first cumulative mass, a second cumulative mass of intake air of the engine that is required to raise a temperature of the engine from an initial temperature at a start of the period to a target temperature. The control system further includes a control module that selectively adjusts one of a diagnostic condition and an operating condition of the engine based on the second cumulative mass.

In one feature, the control module selectively adjusts the one of the diagnostic condition and the operating condition based on a comparison of the target temperature and a second coolant temperature sensed when a total cumulative mass of intake air combusted by the engine is greater than or equal to the second cumulative mass. The diagnostic condition is a diagnostic result that indicates one of a stuck thermostat and a skewed coolant temperature sensor output when the second coolant temperature is less than the target temperature. The operating condition is an estimated engine temperature and the control module adjusts the estimated engine temperature based on a default coolant temperature estimate when the second coolant temperature is less than the target temperature.

In another feature, the first cumulative mass is determined based on a first difference between an average of the plurality of first coolant temperatures and an estimated ambient temperature. The first cumulative mass is further determined based on the period. The second cumulative mass is further determined based on a second difference between the target temperature and the initial temperature.

The present disclosure also provides a method for controlling an engine that includes determining, based on a plurality of first coolant temperatures sensed during a period of engine operation, a first cumulative mass of intake air combusted by the engine during the period that corresponds to an estimated amount of heat dissipated by a cooling system of the engine during the period. The method further includes determining, based on the first cumulative mass, a second cumulative mass of intake air of the engine that is required to raise a temperature of the engine from an initial temperature at a start of the period to a target temperature, and selectively adjusting one of a diagnostic condition and an operating condition of the engine based on the second cumulative mass.

In one feature, the selectively adjusting includes selectively adjusting one of the diagnostic condition and the operating condition based on a comparison of the target temperature and a second coolant temperature sensed when a total cumulative mass of intake air combusted by the engine is greater than or equal to the second cumulative mass. The diagnostic condition is a diagnostic result and the selectively adjusting includes adjusting the diagnostic result to indicate one of a stuck thermostat and a skewed coolant temperature sensor output when the second coolant temperature is less than the target temperature. The operating condition is an estimated engine temperature and the selectively adjusting includes adjusting the estimated engine temperature based on a default coolant temperature estimate when the second coolant temperature is less than the target temperature.

In another feature, the determining the first cumulative mass includes determining the first cumulative mass based on a first difference between an average of the plurality of first coolant temperatures and an estimated ambient temperature. The determining the first cumulative mass further includes determining the first cumulative mass based on the period.

The determining the second cumulative mass further includes determining the second cumulative mass based on a second difference between the target temperature and the initial temperature.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure provides an exemplary control system and method for determining engine coolant heat loss during an engine coolant temperature (ECT) diagnostic test performed by an ECT diagnostic system. The ECT diagnostic system of the present disclosure may be used to detect problems with the coolant temperature sensor and the thermostat. For example, the ECT diagnostic system may be used to detect a thermostat that is stuck in an open position or a coolant temperature sensor that is generating a skewed output.

Generally, the heat loss is determined as a product of a heat loss coefficient multiplied by an engine run time multiplied by a difference between a target temperature and an ambient temperature. The ECT diagnostic system periodically senses a temperature of the coolant during a diagnostic monitoring period and determines an average coolant temperature based on the temperatures sensed. The ECT diagnostic system determines the heat loss during the diagnostic monitoring period based on the average coolant temperature.

The ECT diagnostic system of the present disclosure implements the following temperature model (Equation 1):

$$mC\frac{dT}{dt} = c1\,MAF - c2(T - Tamb), \quad \text{(Equation 1)}$$

where the first term represents a net rate of change in the thermal energy of the coolant, the second term represents an amount of thermal energy generated by the engine that is absorbed by the coolant, and the third term represents the amount of thermal energy dispelled by the coolant to the surroundings (i.e. heat loss). In Equation 1, m is a mass of the coolant, C is a heat capacity of the coolant, dT/dt is a net rate of change in coolant temperature, c1 and c2 are constants, T is an estimated coolant temperature, and Tamb is an estimated ambient temperature. In Equation 1, MAF is a mass air flow of the engine. MAF may be used to estimate the amount of thermal energy (i.e. heat) generated by the engine, since the amount of thermal energy generated is proportional to the mass of air combusted by the engine.

Equation 1 can be rearranged to provide the following equation (Equation 2):

$$mC\,dT = c1\,MAF\,dt - c2(T-Tamb)dt. \quad \text{(Equation 2)}$$

Equation 2 may be integrated over a period from a first time zero to a second time at a target temperature ($T_T$), and an initial temperature at time zero and the target temperature, $T_T$, as follows:

$$\int_{T=0}^{T=T_T} mC\,dT = c1\int_{t=0}^{t=t_T} MAF\,dt - c2\int_{t=0}^{t=t_T} (T - Tamb)\,dt.$$

Integrating Equation 2 yields the following equation (Equation 3):

$$mC(T_T - T_0) = c1 \times TotalAir + c2\int_{t=0}^{t=t_T} (T - Tamb)\,dt, \quad \text{(Equation 3)}$$

where TotalAir represents a cumulative total mass of air combusted by the engine. Equation 3 may be rearranged to provide the following equations (Equations 4 and 5):

$$TotalAir = a1(T_T - T_0) + a2\int_{t=0}^{t=t_T} (T - Tamb)\,dt \quad \text{(Equation 4)}$$

$$MinimumAir = a1(T_T - T_0) + a2\sum (T - Tamb) \times 1 \text{ sec.} \quad \text{(Equation 5)}$$

In Equation 5, MinimumAir is an estimated cumulative total mass of air combusted by the engine when the coolant temperature reaches the target temperature, $T_T$. Additionally, a1 and a2 are constants equal to mC/c1 and c2/c1, respectively. The last term in Equation 5, hereinafter referred to as the heat loss term, accounts for the heat loss. The value of the heat loss term is equal to an estimated mass of combusted air required to produce an amount of heat equal to the heat dispelled by the coolant. The heat loss term may be reformatted for use in a periodic calculation that includes a current best estimate of the ambient temperature during the diagnostic monitoring period. Reformatting the last term for use in a periodic calculation every one second yields the following equation (Equation 6):

$$\sum (T - Tamb) \times \Delta t = \Delta t \times [\sum T - \sum Tamb] \quad \text{(Equation 6)}$$

$$= N \times \Delta t \times \frac{[\sum T - \sum Tamb]}{N}$$

$$= N \times \Delta t \times \left( \frac{[\sum T]}{N} - \frac{[\sum Tamb]}{N} \right)$$

$$= N \times \Delta t \times \left( \frac{[\sum T]}{N} - \frac{[N \times Tamb]}{N} \right)$$

$$= N \times \Delta t \times (Tavg - Tamb)$$

$$= (Runtime + 1) \times (Tavg - Tamb)$$

for a 1 sec loop, where Runtime is the period of time since beginning the diagnostic monitoring period, Tamb is the current best estimate of the ambient temperature, and Tavg is an estimated coolant temperature calculated to avoid precision and memory issues. Tavg may be calculated using the following equation (Equation 7):

$$Tavg_{New} = \frac{[Tavg_{Old} \times (N-1) + T_{New}]}{N}, \quad \text{(Equation 7)}$$

where $Tavg_{New}$ is a new current value of the average coolant temperature for the current control loop, $Tavg_{Old}$ is the average coolant temperature calculated during the previous control loop, $T_{New}$ is a new current coolant temperature for the current control loop, and N is the current number of control loops of the diagnostic monitoring period.

Figure 1:
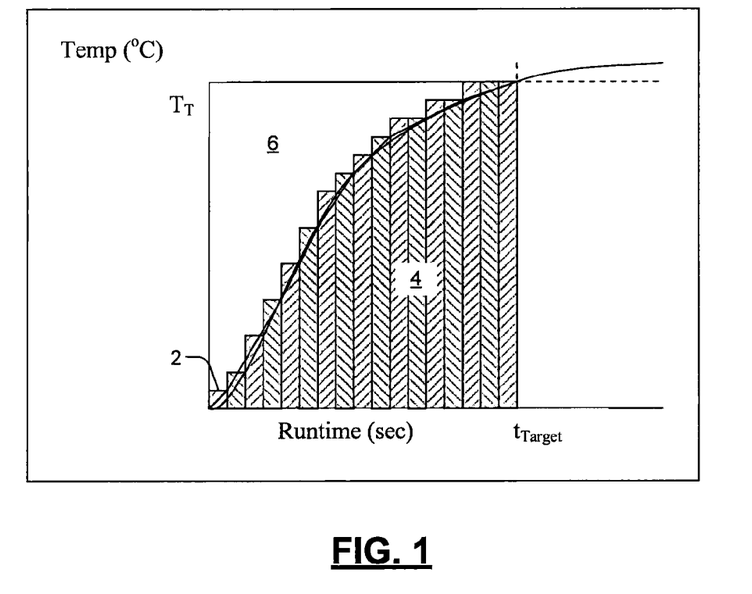
FIG. 1 is a chart illustrating exemplary calculations according to a heat model of the present disclosure.

With particular reference to FIG. 1, exemplary calculations of $Tavg_{New}$ is shown in a chart that plots $Tavg_{New}$ in bars 2 for successive control loops during the diagnostic monitoring period. In each control loop during the diagnostic monitoring period, a new value of $Tavg_{New}$ is calculated and used in Equations 5, 6 to update the heat loss term and determine a new MinimumAir value. The area 4 represented by the bars 2 (i.e. area under the curve) is proportional to the total heat loss determined using $Tavg_{New}$ according to the principles of the present disclosure. The area 6 represented by the square area defined by $T_T$ and $t_{Target}$ is proportional to the heat loss determined using other methods that estimate the heat loss using a difference between $T_T$ and the ambient temperature multiplied by the run time. By implementing the temperature model of Equation 1, the present disclosure improves the calculation of heat loss and avoids overestimating the heat loss during the diagnostic monitoring period.

Figure 2:
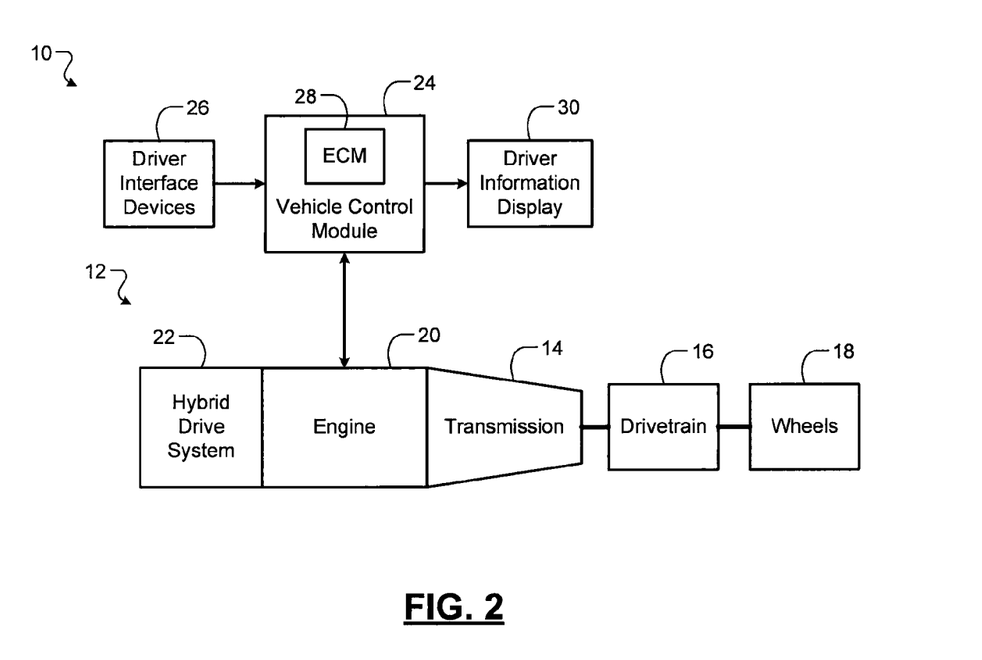
FIG. 2 is a functional block diagram illustrating an exemplary vehicle system according to the principles of the present disclosure.
Figure 3:
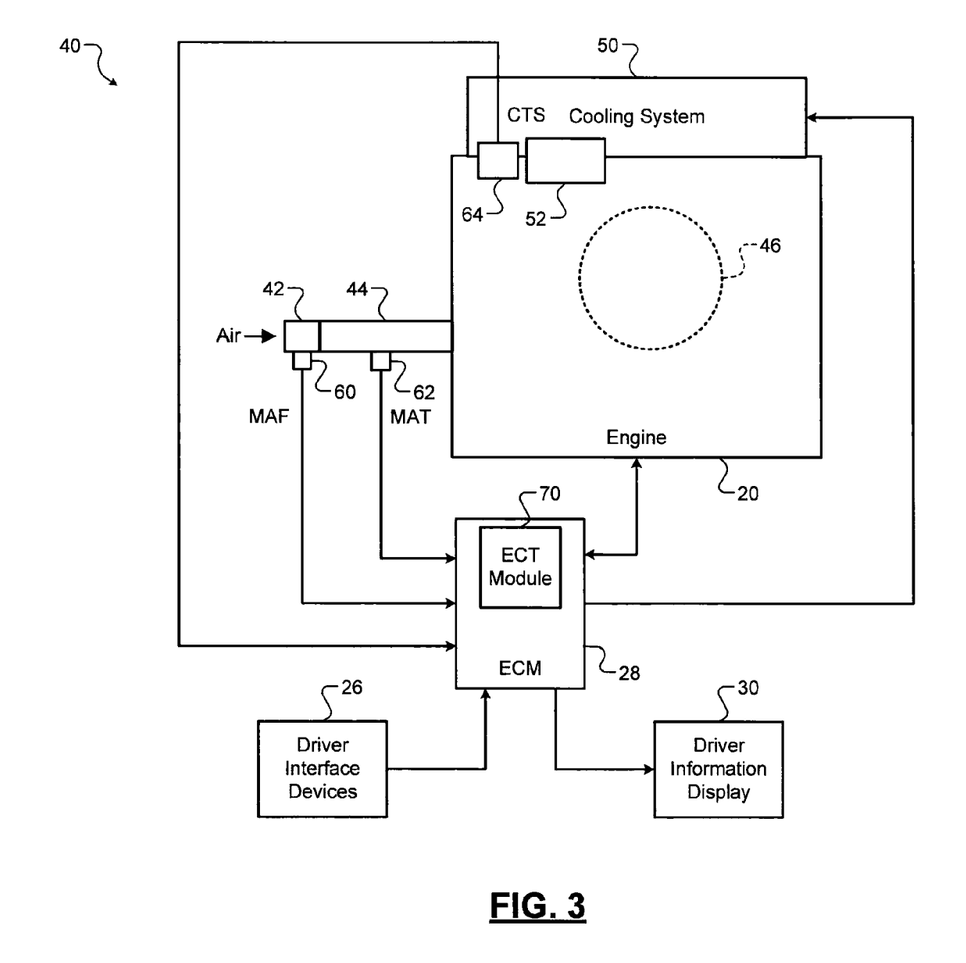
FIG. 3 is a functional block diagram illustrating an exemplary engine control system according to the principles of the present disclosure.
Figure 4:
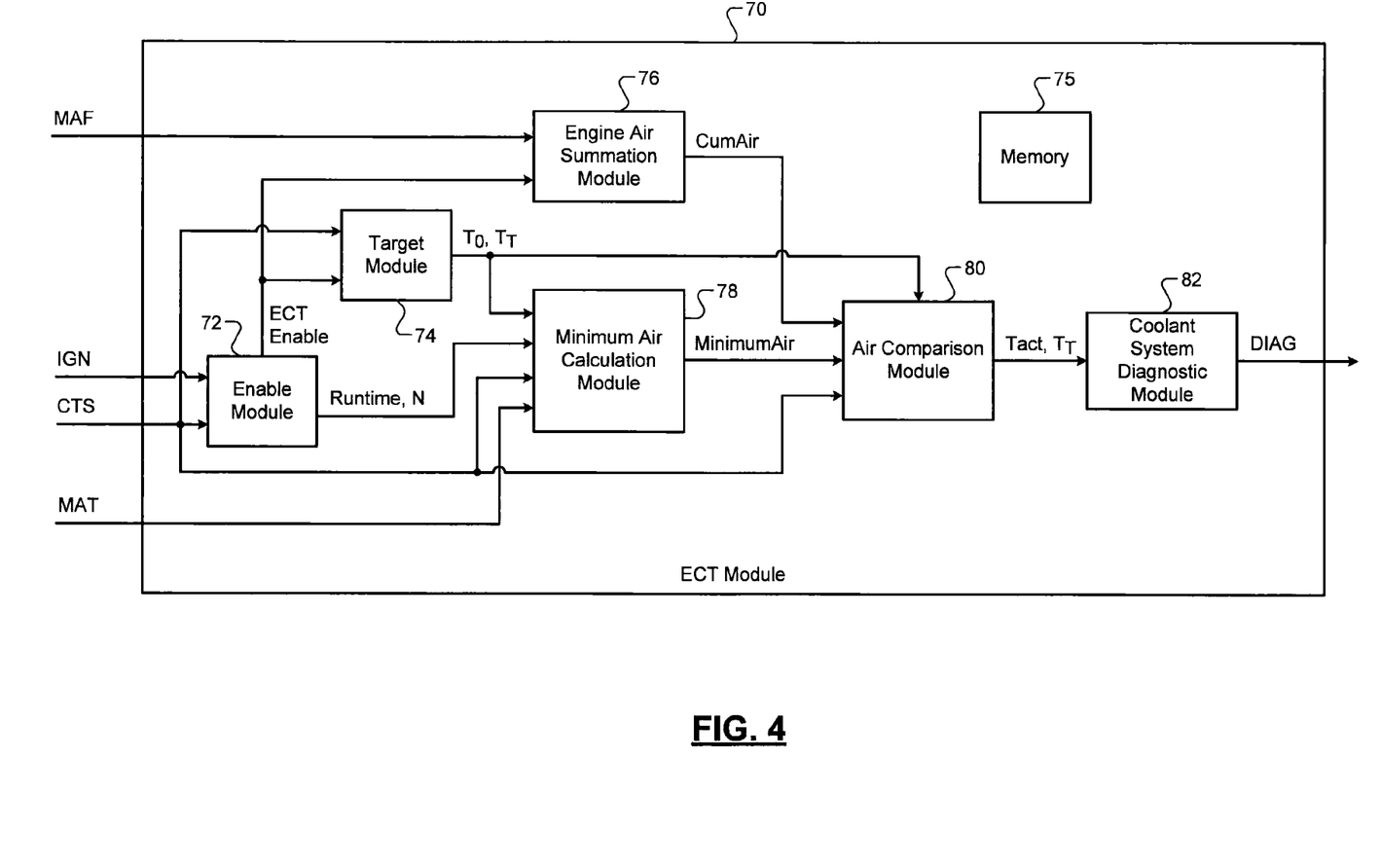
FIG. 4 is a functional block diagram illustrating an exemplary control module according to the principles of the present disclosure.

With reference to FIGS. 2-4, an exemplary control system implementing the heat model of the present disclosure in a vehicle system will now be described. With particular reference to FIG. 2, an exemplary vehicle system 10 may include a powerplant 12 that produces drive torque that is transmitted through a transmission 14 and a drivetrain 16 to drive one or more wheels 18 of the vehicle. The powerplant 12 may be a hybrid powerplant that includes an internal combustion engine 20 and a hybrid drive system 22.

The vehicle system 10 may further include a vehicle control module (VCM) 24 that regulates the various components of the vehicle system 10 based on driver input signals received from driver interface devices 26, such as an accelerator pedal (not shown). For example, the VCM 24 may include an engine control module (ECM) 28 that regulates operation of the engine 20. The VCM 24 may communicate information regarding the operation of the vehicle system 10 to a driver information display 30.

With particular reference to FIG. 3, an exemplary engine control system 40 for the engine 20 is shown. Air drawn in by the engine 20 through a throttle 42 and an intake manifold 44 mixes with fuel provided by a fuel system (not shown) and enters cylinders where the air-fuel mixture is combusted. For example only, a single cylinder 46 is shown. Heat produced by the combustion of the air-fuel mixture is absorbed by coolant (not shown) that is circulated throughout the engine 20 and a cooling system 50 in fluid communication with the engine 20. The cooling system 50 may include a thermostat 52 located at an inlet or an outlet (not shown) between the engine 20 and a radiator (not shown) of the cooling system 50. The thermostat 52 inhibits the flow of coolant below a regulated temperature of the coolant. For example only, the regulated temperature may be about 90° C.

A mass air flow (MAF) sensor 60 may be located proximate the throttle 42 and may sense a mass air flow of the air entering the engine 20. The MAF sensor 60 may generate a MAF signal based on the mass air flow sensed that is output to the ECM 28. A manifold air temperature (MAT) sensor 62 may be located in the intake manifold 44 and may sense a temperature of the air therein. The MAT sensor 62 may generate a MAT signal based on the temperature sensed that is output to the ECM 28. A coolant temperature (CTS) sensor 64 may be located in the engine 20 proximate the thermostat 52. The CTS sensor 64 may sense a temperature of a coolant volume on the hot side of the cooling system 50. The CTS sensor 64 may generate a CTS signal based on the temperature sensed that is output to the ECM 28.

The ECM 28 regulates the operation of the engine 20 based on signals received including, but not limited to, the signals generated by the driver interface devices 26 and the sensors 60-64. The ECM 28 also monitors the operation of the engine 20 and detects problems that may arise during the operation. The ECM 28 may include an ECT module 70 that detects problems with the thermostat 52 and the CTS sensor 64 according to the principles of the present disclosure. The ECM 28 may adjust one or more operating conditions of the engine 20, such as an amount of air drawn in and/or an amount of fuel provided by the fuel system, based on whether a problem is detected. The ECM 28 may also adjust estimates of other operating conditions, such as an estimated temperature of the engine 20, that are used to regulate operation of the engine 20. For example, the ECM 28 may determine the estimated engine temperature based on a default coolant temperature when a problem is detected. The default coolant temperature may be a default coolant temperature estimate based on one or more operating conditions.

With particular reference to FIG. 4, an exemplary ECT module 70 is shown. The ECT module 70 generates a diagnostic signal (DIAG) indicating whether there is a problem with the thermostat 52 and/or the CTS sensor 64. In particular, the DIAG signal indicates whether the thermostat 52 may be stuck in an open position and/or the CTS sensor is generating an output signal (i.e. CTS signal) which is skewed low.

The ECT module 70 implements the heat model of the present disclosure in an ECT diagnostic test that may detect problems with the thermostat 52 and the CTS sensor 64. The ECT diagnostic test accounts for heat loss during a diagnostic monitoring period. The ECT module 70 may perform the ECT diagnostic test and may generate the DIAG signal based on the results of the test. In this manner, the ECT module 70 may selectively adjust a diagnostic condition. The ECT module 70 may perform the ECT diagnostic test when the temperature of the engine 20 is below the regulated temperature, such as during periods following cold starting of the engine 20 or after prolonged periods of engine inactivity.

The ECT module 70 includes an enable module 72 and a target module 74. The enable module 72 receives signals that include an ignition (IGN) signal and the CTS signal. The enable module 72 determines whether to run the ECT diagnostic test and communicates an ECT enable signal to the target module 74 indicating whether the ECT diagnostic test should be run. During execution of the ECT diagnostic test, the enable module 72 outputs a period (Runtime) and number of control loops (N) executed since the ECT diagnostic test began running. The target module 74 monitors the ECT enable signal and determines an initial coolant temperature ($T_0$) at the start of the ECT diagnostic test. The target module 74 also determines the target temperature, $T_T$, based on $T_0$. The target temperature, $T_T$, may be a calibrated value stored in memory based on $T_0$. The target module 74 may look $T_T$ up in memory 75 based on $T_0$.

The ECT module 70 further includes an engine air summation module 76, a minimum air calculation module 78, and an air comparison module 80. The engine air summation module 76 receives the ECT Enable signal and the MAF signal. Based on the signals received, the engine air summation module 76 determines a cumulative total mass of air combusted by the engine 20 (CumAir) since the ECT diagnostic test began running. The engine air summation module 76 outputs CumAir to the air comparison module 80.

The minimum air calculation module 78 receives Runtime, N, $T_0$, $T_T$, and the CTS and MAT signals and determines an estimated engine air mass (MinimumAir) that accounts for heat loss. The minimum air calculation module 78 may determine MinimumAir according to Equation 5. When determining MinimumAir according to Equation 5, the minimum air calculation module 78 may look up the value of al($T_T$–$T_0$) based on $T_0$. The minimum air calculation module 78 may also determine the value of the heat loss term based on the Runtime, an average coolant temperature (Tavg), and a best estimate of the ambient temperature (Tamb) according to Equations 5 and 6. The minimum air calculation module 78 may determine Tavg for each control loop according to Equation 7. The minimum air calculation module 78 may determine Tamb based on the MAT signal. The minimum air calculation module 78 outputs MinimumAir to the air comparison module 80.

The air comparison module 80 compares CumAir and MinimumAir and determines a temperature of the coolant (Tact) at a point in time when CumAir becomes greater than or equal to MinimumAir. The air comparison module 80 may receive the CTS signal and may determine Tact based on the coolant temperature indicated by the CTS signal at the appropriate time. The air comparison module 80 outputs Tact to a coolant system diagnostic module 82. The air comparison module 80 may receive $T_T$ from the target module 74 and may output $T_T$ to the coolant system diagnostic module 82 as shown.

The ECT module 70 further includes a coolant system diagnostic module 82 that compares Tact and $T_T$ and adjusts a diagnostic condition (e.g., diagnostic result) based on the comparison. If Tact is less than $T_T$, the coolant system diagnostic module 82 fails the diagnostic test and outputs DIAG to indicate a problem with the cooling system 50. If Tact is greater than or equal to $T_T$, the coolant system diagnostic module 82 passes the diagnostic test and outputs DIAG to indicate a problem was not detected with the cooling system 50.

In view of the foregoing, it will be appreciated that the ECT module 70 accounts for heat loss during the diagnostic monitoring period (i.e. Runtime) of the ECT diagnostic test. The ECT module 70 determines the diagnostic result based on control parameters that include CumAir, MinimumAir, and $T_T$. As previously discussed herein, the ECM 28 may adjust one or more engine operating conditions and/or engine control parameters based on the diagnostic result.

Figure 5:
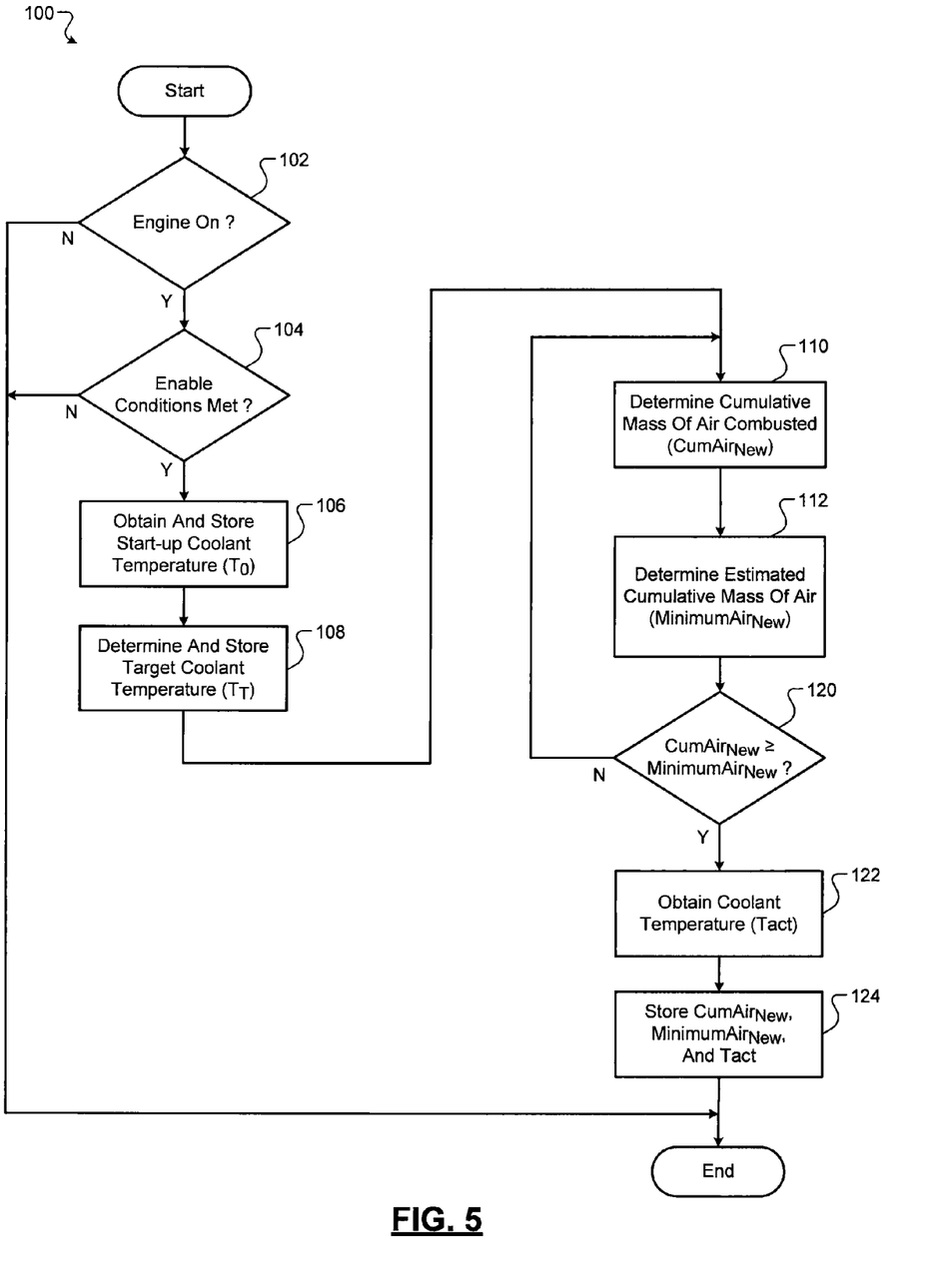
FIG. 5 is a flow diagram illustrating exemplary steps for determining control parameters according to the principles of the present disclosure.

With particular reference to FIG. 5, an exemplary control method 100 for determining control parameters for an ECT diagnostic method according to the principles of the present disclosure is shown. The method 100 may be implemented with one or more control modules of the engine control system 40, such as the ECT module 70 previously discussed herein. For simplicity, the control parameters previously discussed with reference to the engine control system 40 will be referred to where appropriate. The method begins in step 102 where control determines whether the engine is on. If the engine is on, control proceeds in step 104, otherwise control ends.

In step 104, control determines whether enable conditions for running the ECT diagnostic test have been met. In general, the enable conditions will be met where the engine was just started, the coolant temperature is below the regulated temperature, and there are no other overriding conditions. Overriding conditions may exist when signals generated by one or more of the sensors of the engine control system 40, such as the MAT sensor 62 and the CTS sensor 64, have been determined to be unreliable. If the enable conditions are met, control proceeds in step 106 otherwise control loops back as shown.

In step 106, control obtains and stores the start-up coolant temperature $T_0$ corresponding to the time when control determined the enable conditions were met in step 104. Control proceeds in step 108 where control determines and stores the target coolant temperature $T_T$. Control may look up $T_T$ in memory based on $T_0$. Control proceeds in step 110 where control determines a new cumulative total mass of air (CumAir$_{New}$) combusted by the engine for the current control loop. Control may determine CumAir$_{New}$ based on the MAF during the period (Runtime) since the enable conditions were met in step 104.

Control proceeds in step 112 where control determines a new estimated engine air mass (MinimumAir$_{New}$) for the current control loop that accounts for the heat loss since the enable conditions were met in step 104. Control determines MinimumAir$_{New}$ according to Equation 5 based on $T_T$ and $T_0$. When determining MinimumAir$_{New}$, control accounts the heat loss according to Equations 6 and 7 based on the period (Runtime), the number of control loops (i.e. N), the best estimate of the ambient temperature (Tamb), and the average coolant temperature (Tavg$_{New}$) since the enable conditions were met. Control determines Tamb based on the MAT. Control may periodically update Tamb during control under the method 100 to account for the initial influence of engine heat on the MAT indicated at startup.

Figure 6:
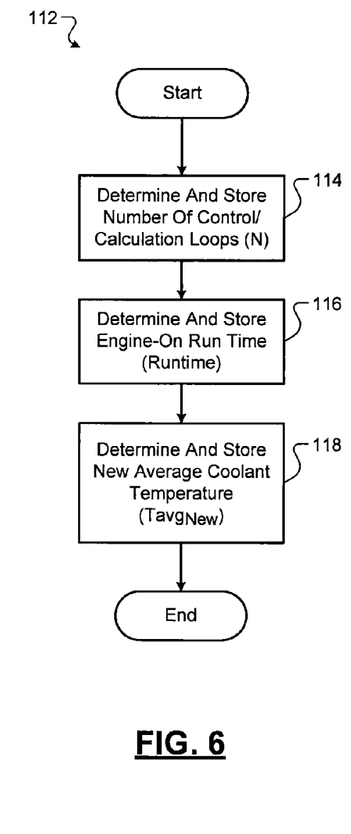
FIG. 6 is a flow diagram illustrating additional exemplary steps for the method shown in FIG. 5.

With particular reference to FIG. 6, exemplary steps for determining Tavg$_{New}$ are shown. In step 114, control determines N and stores N in memory for retrieval in subsequent control steps. In step 116, control determines Runtime and stores Runtime in memory. In step 118, control determines a new value for $Tavg_{New}$ according to Equation 7 based on N and the value of $Tavg_{New}$ determined in the previous control loop. Control may look up the value of $Tavg_{New}$ determined in the previous control loop in memory. In step 118, control stores the new value of $Tavg_{New}$ in memory.

Referring again to FIG. 5, control proceeds in step 120 where control compares $CumAir_{New}$ and $MinimumAir_{New}$. If $CumAir_{New}$ is greater than or equal to $MinimumAir_{New}$, control proceeds in step 122, otherwise control loops back as shown to begin another control loop under the method 100. In step 122, control obtains a temperature of the coolant (Tact). Control may obtain the temperature of the coolant, Tact, for the point in time when CumAir became greater than or equal to MinimumAir. Next in step 124, control stores $CumAir_{New}$, $MinimumAir_{New}$ and Tact and control ends.

Figure 7:
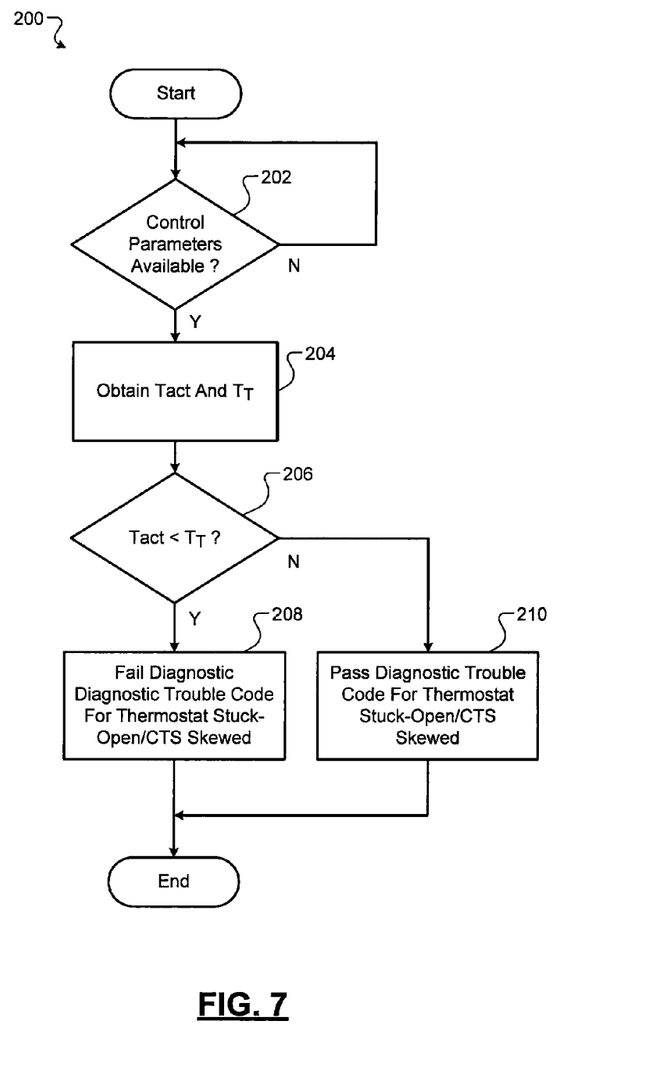
FIG. 7 is a flow diagram illustrating exemplary steps for a diagnostic method according to the principles of the present disclosure.

With particular reference to FIG. 7, an exemplary ECT diagnostic method 200 according to the principles of the present disclosure is shown. The method 200 determines a diagnostic result based on the control parameters determined according to the method 100. In particular, the method 200 determines the diagnostic result based on values for Tact and $T_T$ determined according to the method 100. The method 200 may be implemented with one or more control modules of the engine control system 40. The method 200 may run once per vehicle trip (i.e. key cycle).

Control under the method 200 begins in step 202 where control determines whether the method 100 has run during the current vehicle trip and control parameters according to the method 100 are available. If the method 100 has successfully completed during the current vehicle trip, then control continues in step 204, otherwise control loops back as shown.

In step 204, control obtains Tact and $T_T$ from memory. In step 206, control compares Tact and $T_T$. If Tact is less than $T_T$, control proceeds in step 208, otherwise control proceeds in step 210. In step 208, control fails the diagnostic trouble code for the thermostat stuck-open/CTS signal skewed and control ends. In step 210, control passes the diagnostic trouble code for thermostat stuck-open/CTS signal skewed and control ends.

From the foregoing description, it will be appreciated the ECT diagnostic method 200 determines the diagnostic result for the thermostat stuck-open/CTS skewed DTC based on a coolant temperature value, Tact, and a target coolant temperature value, $T_T$, determined according to the control method 100. The values for Tact and $T_T$ account for heat dispelled by the engine and coolant system during the diagnostic monitoring period. The value of Tact is based on the average temperature of the coolant sensed during the diagnostic monitoring period. The methods 100, 200 may be implemented in an engine control system, such as the engine control system 40 described herein.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine comprising:
    an air calculation module that determines, based on a plurality of first coolant temperatures sensed during a period of engine operation, a first cumulative mass of intake air combusted by said engine during said period that corresponds to an estimated amount of heat dissipated by a cooling system of said engine during said period, and that determines, based on said first cumulative mass, a second cumulative mass of intake air of said engine that is required to raise a temperature of said engine from an initial temperature at a start of said period to a target temperature; and
    a control module that selectively adjusts one of a diagnostic condition and an operating condition of said engine based on said second cumulative mass.

2. The control system of claim 1, wherein said control module selectively adjusts said one of said diagnostic condition and said operating condition based on a comparison of said target temperature and a second coolant temperature sensed when a total cumulative mass of intake air combusted by said engine is greater than or equal to said second cumulative mass.

3. The control system of claim 2, wherein said diagnostic condition is a diagnostic result that indicates one of a stuck thermostat and a skewed coolant temperature sensor output when said second coolant temperature is less than said target temperature.

4. The control system of claim 2, wherein said operating condition is an estimated engine temperature, and wherein said control module adjusts said estimated engine temperature based on a default coolant temperature estimate when said second coolant temperature is less than said target temperature.

5. The control system of claim 1, wherein said first cumulative mass is determined based on a first difference between an average of said plurality of first coolant temperatures and an estimated ambient temperature.

6. The control system of claim 5, wherein said first cumulative mass is further determined based on said period.

7. The control system of claim 1, wherein said second cumulative mass is further determined based on a second difference between said target temperature and said initial temperature.

8. A method for controlling an engine comprising:
    determining, based on a plurality of first coolant temperatures sensed during a period of engine operation, a first cumulative mass of intake air combusted by said engine during said period that corresponds to an estimated amount of heat dissipated by a cooling system of said engine during said period;
    determining, based on said first cumulative mass, a second cumulative mass of intake air of said engine that is required to raise a temperature of said engine from an initial temperature at a start of said period to a target temperature; and
    selectively adjusting one of a diagnostic condition and an operating condition of said engine based on said second cumulative mass.

9. The method of claim 8, wherein said selectively adjusting includes selectively adjusting one of said diagnostic condition and said operating condition based on a comparison of said target temperature and a second coolant temperature sensed when a total cumulative mass of intake air combusted by said engine is greater than or equal to said second cumulative mass.

10. The method of claim 9, wherein said diagnostic condition is a diagnostic result and said selectively adjusting includes adjusting said diagnostic result to indicate one of a stuck thermostat and a skewed coolant temperature sensor output when said second coolant temperature is less than said target temperature.

11. The method of claim 9, wherein said operating condition is an estimated engine temperature, and wherein said selectively adjusting includes adjusting said estimated engine temperature based on a default coolant temperature estimate when said second coolant temperature is less than said target temperature.

12. The method of claim 8, wherein said determining said first cumulative mass includes determining said first cumulative mass based on a first difference between an average of said plurality of first coolant temperatures and an estimated ambient temperature.

13. The method of claim 12, wherein said determining said first cumulative mass further includes determining said first cumulative mass based on said period.

14. The method of claim 8, wherein said determining said second cumulative mass further includes determining said second cumulative mass based on a second difference between said target temperature and said initial temperature.

* * * * *